United States Patent [19]

Brooks et al.

[11] Patent Number: 4,948,654
[45] Date of Patent: Aug. 14, 1990

[54] SHEET MATERIAL USEFUL IN FORMING PROTECTIVE AND DECORATIVE COATINGS

[75] Inventors: Richard V. Brooks; Michael C. Carmody, Kingsport, both of Tenn.

[73] Assignee: Eastman Kodak Company, Rochester, N.Y.

[21] Appl. No.: 317,878

[22] Filed: Feb. 27, 1989

[51] Int. Cl.⁵ .................... B32B 5/16; B32B 27/08; B32B 27/36

[52] U.S. Cl. ................... 428/201; 428/204; 428/480; 428/483; 428/913.3; 430/523; 430/531

[58] Field of Search ............ 428/31, 480, 201, 204, 428/208, 253, 482, 483, 315, 290, 517, 425.1, 913.3; 430/531, 523, 502; 524/765; 156/87; 264/24

[56] References Cited

U.S. PATENT DOCUMENTS

| | | | |
|---|---|---|---|
| 2,761,791 | 9/1956 | Russell | 430/531 |
| 2,941,898 | 6/1960 | Wynn | 430/523 |
| 3,206,323 | 9/1965 | Miller | 430/502 |
| 3,425,857 | 2/1969 | Bacon et al. | 430/523 |
| 3,508,947 | 4/1970 | Hughes | 430/523 |
| 3,551,232 | 12/1970 | Thompson | 156/87 |
| 3,645,773 | 2/1972 | Herzhoff et al. | 430/523 |
| 3,935,353 | 1/1976 | Doerfling et al. | 428/253 X |
| 4,001,024 | 1/1977 | Dittman et al. | 430/502 |
| 4,205,028 | 5/1980 | Brueggemann et al. | 264/24 |
| 4,258,106 | 3/1981 | Cottrell, Jr. et al. | 428/482 |
| 4,282,285 | 8/1981 | Mohiuddin | 428/315 |
| 4,349,469 | 9/1982 | Davis et al. | 524/765 |
| 4,350,739 | 9/1982 | Mohiuddin | 428/425.1 |
| 4,356,230 | 10/1982 | Emanuel et al. | 428/290 |
| 4,656,098 | 4/1987 | Yonekura et al. | 428/517 |
| 4,751,121 | 6/1988 | Kühnel et al. | 428/31 X |
| 4,769,100 | 9/1988 | Short et al. | 428/31 X |
| 4,810,540 | 3/1989 | Ellison et al. | 428/208 X |
| 4,818,589 | 4/1989 | Johnson et al. | 428/204 X |

*Primary Examiner*—Thomas J. Herbert
*Attorney, Agent, or Firm*—John F. Stevens; William P. Heath, Jr.

[57] ABSTRACT

A sheet material for covering substrates comprising (a) a carrier layer comprising a polymer selected from polyesterethers, copolyesters and blends thereof, and (b) a tie layer bonded thereto, said tie layer being a low molecular weight polymer containing ethylene repeat units. The sheet material is provided with a decorative and/or protective coating, and preferably, a top coat.

11 Claims, 1 Drawing Sheet

SHEET MATERIAL USEFUL IN FORMING PROTECTIVE AND DECORATIVE COATINGS

FIELD OF INVENTION

This invention relates in general to the art of providing protective and decorative coatings of the type most typically applied in industry by spray painting techniques. More specifically, this invention relates to sheet material that can be bonded to various substrates, including exterior automotive panels, to achieve desired protective and decorative effects and thereby reduce or eliminate the need to utilize spray painting processes in the manufacturing operation. The invention also relates to a process for laminating such sheet material to a substrate.

BACKGROUND OF THE INVENTION

To facilitate an understanding of the many advantages of the invention and to provide for ease of description, the invention will be specifically described hereinafter with reference to providing protective and/or decorative coatings on exterior automotive panels, but it should be understood that the automobile is only one of many different types of products in whose manufacture the invention can be beneficially applied.

There is a growing need to reduce the amount of atmospheric pollution caused by solvents emitted during industrial painting processes. Many different approaches to meeting this need have been proposed. For example, efforts have been made to replace the solvent-based paints typically used for automobiles with water-based paints. As another alternative, work has been done to facilitate the use of high solids formulations which will result in proportionately less emission of organic solvents. However, the application of automotive finishes is a highly demanding art because of the extremely high quality of the surface finish required and because of the very common application of metallic finishes to provide "high stylistic effects". Accordingly, past efforts to replace the low viscosity, low-solids-content paint formulations conventionally used in spray painting operations in the automotive industry have met with only very limited success.

A much more promising approach to solving the problem is to eliminate entirely the need for spray painting operations to provide the necessary protective and decorative coating on exterior automotive panels. Elimination of spray painting, or a substantial reduction in the extent of its use, would not only be environmentally beneficial in reducing atmospheric pollution, but would be extremely beneficial from a cost savings standpoint in that spray painting operations are wasteful of the paint to such an extent that more than half of the paint may be lost as waste material. A means for achieving such goal exists through the use of a pre-formed thermoplastic sheet material which can be glued or otherwise securely bonded to the panel to provide the protective and decorative coating. Such techniques are well known and widely used in industry, and have been utilized for such purposes as interior automobile panels as described, for example, in U.S. Pat. No. 3,551,232 issued Dec. 29, 1970. This art is summarized in the aforesaid patent in the following words:

"It is present day conventional practice to make structural members consisting of a relatively rigid substrate to which is bonded as a surface or cover layer a synthetic resin sheet. The surface layer may be smooth or embossed and may be suitably colored to provide a desired decorative effect. The substrate may be formed of a relatively rigid synthetic resin, such as polystyrene, or sheet metal, and the surface layer and the substrate are bonded together to form a laminate. Such structures may be used for a variety of purposes such as interior automobile panels, glove compartment doors, and the like.

A convenient and economical method for making such articles involves the application of a suitable adhesive to the surface of the substrate and then vacuum forming the decorative cover layer over the adhesive layer of the substrate".

The objective of U.S. Pat. No. 3,551,232 is to overcome the problems of bubbling and blistering of the resin sheet that tend to occur in the vacuum-forming process. It achieves this by use of an adhesive containing an inert particulate filler which minimizes the entrapment of air.

To employ a process of the type described in U.S. Pat. No. 3,551,232 with exterior automotive panels presents a much greater challenge. The surface appearance of such panels is of critical importance, so that it is necessary not only to avoid such problems as bubbling or blistering caused by entrapped air, but to provide a protective and decorative coating that will equal or exceed in many respects, the quality of a spray painted surface and that is equally capable of providing the "high stylistic effects" that are of growing importance in the automotive marketplace. Furthermore, exterior automotive panels present a particular problem in view of the great difficulty of smoothly adhering a flexible sheet material to a substrate which may possess complex curvature and the even greater difficulty of doing so while maintaining over the entire surface of the panel a uniform degree of the color intensity exhibited by the coating.

It is toward the objective of providing sheet material which is capable of conforming to a three-dimensional mold, such as would be used to form an exterior automotive panel, to provide a high quality protective and decorative coating of uniformly attractive appearance and to provide such sheet material with improved bonding ability to selected substrates, particularly polyolefin substrates, that the present invention is directed.

Patents of interest include U.S. Pat. Nos. 4,282,285; 4,350,739; 4,,356,230; 4,656,098; 4,258,106; and 4,205,028.

DESCRIPTION OF THE INVENTION

Figure 1:
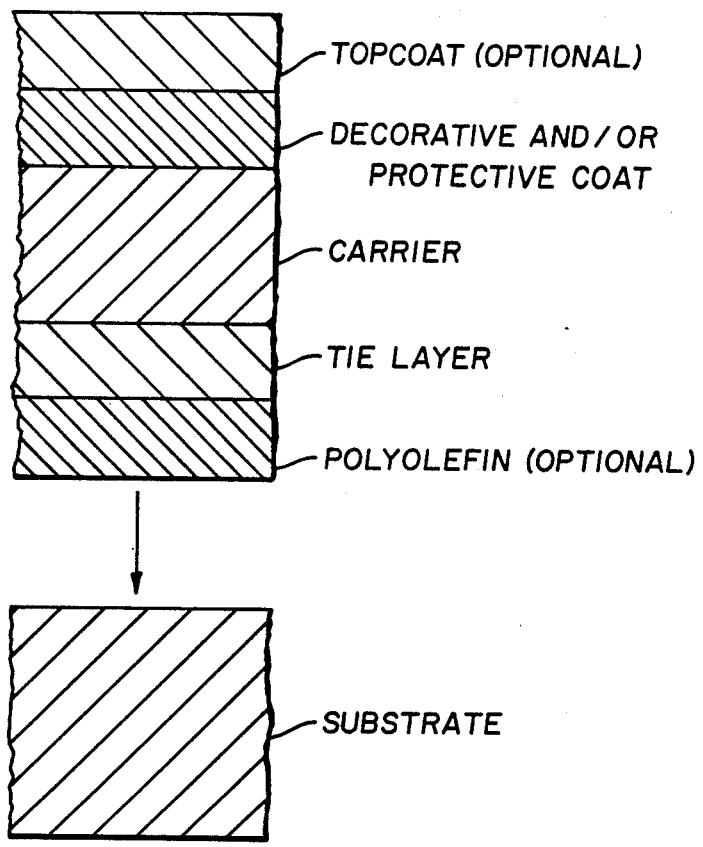
FIG. 1 is a cross sectional view illustrating the various layers of the sheet material according to this invention.

In accordance with this invention, there is provided a sheet material that is (1) capable of meeting the demanding requirements of an exterior automotive finish and (2) capable of withstanding the heat and other forces involved in an in-mold forming process. There is also provided a finished panel or support, and a process for forming it by first placing the sheet material according to this invention as a liner on an interior side of a mold, and then injecting a flowable material into the mold so that the sheet material forms one surface thereof.

The sheet material of this invention is normally flexible and comprises a thin carrier layer and a tie layer for insuring an adequate bond with the substrate to be molded against it. Normally, the carrier will have or be adapted to receive a decorative and/or protective coating on the side thereof opposite the tie layer. The sheet material according to this invention normally also will have a polyolefin bonded to the tie layer as a protection for the tie layer and to aid in bonding the sheet material to a substrate, normally a polyolefin.

In an important embodiment of the invention, the protective and decorative coating is a paint layer comprising a film-forming binder, a colorant and generally flat light reflecting particles which are oriented substantially parallel to the surface of the coating to provide a high degree of geometric metamerism. However, the protective and decorative coating may be of other types known in the art.

In another embodiment of this invention, there is provided a structural element having securely bonded to at least one surface thereof in a uniform wrinkle free state the sheet material according to this invention.

Other advantageous features will become readily apparent upon reference to the following description of the preferred embodiments when read in light of the accompanying drawings.

In accordance with this invention, it has been unexpectedly discovered that the many difficult problems inherent in fabricating a flexible sheet material that is adapted for use in conforming to a three-dimensional substrate and bonded thereto so as to form a smooth and wrinkle-free protective and decorative coating can be effectively obviated by the sheet material of this invention. Such sheet material has been found, most surprisingly, to produce a finished product with a protective and decorative coating that is free of distortion such as ripples, wrinkles, kink marks, and the like and that exhibits an appearance at least equal in overall quality to that achievable by spray coating.

This invention is based at least partly on the recognition that a flexible sheet material can have individual layers having a high degree of adhesion and be capable of being bonded to a substrate with a high degree of adhesion. In a particularly preferred embodiment, the invention is based on the further recognition that such sheet material can meet the exacting demands of the automotive industry for very high quality exterior automotive finishes. Being capable of meeting the stringent demands of the automotive industry, the sheet material of this invention is, of course, also suitable for use in many other less demanding applications and is readily adaptable for use with a very wide variety of substrates, to which it can be attached by an adhesive or by being integrally bonded thereto by techniques such as heat fusion.

According to this invention, there is provided flexible and stretchable sheet material including a carrier layer comprising a polyesterether, copolyester or a blend thereof and a tie layer bonded thereto, said tie layer being a low molecular weight polymer containing ethylene repeat units, having a melt flow rate of about 0.25 to about 40 gm/10 min, a tensile strength at break of at least 25 kg/cm$^2$, an elongation at break of greater than 100 percent and a melting point of at least 65 C°.

According to still another aspect of this invention there is provided a structural element comprising a substrate having securely bonded to at least one surface thereof in a smooth and wrinkle-free state the sheet material described above.

The polymeric carrier used in the sheet material described above is a polyesterether, a copolyester, or a blend of a polyesterether and copolyester. The copolyesterether is described as having an I.V. of about 0.8–1.5 and repeat units from (1) a dicarboxylic acid component consisting essentially of 1,4-cyclohexanedicarboxylic acid having a trans isomer content of at least 70 percent, and (2) a glycol component consisting essentially of (a) about 95 to about 65 mol percent 1,4-cyclohexanedimethanol, and (b) about 5 to about 35 mol percent poly(oxytetramethylene) glycol having a molecular weight of about 500 to about 1100.

The dibasic acid component of the polyesterether of this invention consists essentially of 1,4-cyclohexanedicarboxylic acid having a trans isomer content of at least 70 percent, preferably at least 80 percent and most preferably at least 85 percent trans isomer content.

1,4-Cyclohexanedicarboxylic acid and 1,4-cyclohexanedimethanol are well known in the art and commercially available. "Man Made Fibers: Science and Technology," Vol. III, edited by Mark, Atlas and Cernia, published by Interscience Publishers describes preparation of 1,4-cyclohexanedicarboxylic acid and 1,4-cyclohexanedimethanol at Page 85.

The poly(oxytetramethylene) glycol component of the polyetherester is commercially available, and is prepared by well known techniques. The poly(oxytetramethylene) glycol has a molecular weight of between about 500 and about 1100, preferably about 1000 (weight average).

The polyesterether further may comprise up to about 1.5 mol percent, based on the acid or glycol component, of a polybasic acid or polyhydric alcohol branching agent having at least three COOH or OH functional groups and from 3 to 60 carbon atoms. Esters of many such acids are polyols may also be used. Suitable branching agents include trimellitic acid or anhydride, trimesic acid, trimethylol ethane, trimethylol propane, and trimer acid.

It should be understood that the total acid reactants should be 100 percent, and the total glycol reactants should be 100 mol percent. Although the acid reactant is said to "consist essentially of" 1,4-cyclohexanedicarboxylic acid, if the branching agent is a polybasic acid or anhydride, it will be calculated as part of the 100 mol percent acid. Likewise, the glycol reactant is said to "consist essentially of" 1,4-cyclohexanedimethanol and poly(oxytetramethylene) glycol, if the branching agent is a polyol, it will be calculated as part of the 100 mol percent glycol.

The polyesterethers preferably include a phenolic antioxidant. It is preferred that the phenolic antioxidant be hindered and relatively non volatile. Tetrakis[methylene(3,5-di-tert-butyl-4-hydroxyhydrocinnamate)methane] which is commercially available from Ciba Geigy Chemical Company as Irganox 1010 antioxidant, is preferred. Preferably, the antioxidant is used in an amount of from about 0.1 to about 1.0, based on the weight of copolyesterether.

The trans and cis isomer contents of the final copolyesterether are controlled in order to give polymers that setup or crystallize rapidly. Cis and trans isomer contents are measured by conventional methods well known to those skilled in the art. See. for example, U.S. Pat. No. 4,349,469.

The polyetherester used in this invention may be prepared by conventional techniques. See for example, U.S. Pat. No. 4,349,469. It should be understood that the support sheet may contain stabilizers, colorants, processing aids, reinforcing materials such as glass fibers, flame retardants, etc.

The copolyesters which may be used for blending with the polyesterether are in general, polyesters of terephthalic acid with two or more glycols having 2 to 10 carbon atoms. The preferred glycols are ethylene glycol and 1,4-cyclohexanedimethanol, in ratios of about 20:80 to 80:20 by weight. These copolyesters are prepared using techniques well known in the art.

The tie layers are of a low molecular weight polyethylene having a melt flow rate of about 0.25 to about 40.0 g/10 min, preferably about 1.0 g/10 min, as measured according to ASTM-D1238. Such low molecular weight polyethylene is available commercially from Mitsui Petrochemical Industries, Ltd., as Admer AT-469C adhesive polyolefin resin. Admer AT-469C is described as having a melt flow rate (190° C.) of 1.0 g/10 min (ASTM-D1238) a density of 0.88 g/cm$^3$ (ASTM-D1505), a tensile strength at break of 30 kg/cm$^2$ (ASTM-D638), an elongation at break of >500 percent (ASTM-D638), Izod impact strength of unbreakable (ASTM-D256), a D shore hardness of 16 (ASTM-D2240), an A-shore hardness of 72 (ASTM-D2240), a melting point of 75° C. (DSC), and excellent clarity.

The tie layer material is generally a low molecular weight polymer of ethylene with about 0.1 to about 30 wt percent of at least one unsaturated monomer which can be copolymerized with ethylene, e.g., maleic acid, fumaric acid, acrylic acid, methacrylic acid, vinyl acetate, acrylonitrile, methacrylonitrile, butadiene, carbon monoxide, etc. Preferred are acrylic esters, maleic anhydride, vinyl acetate, and methacrylic acid. Many such polymers are commercially available under trademarks such as Admer AT 469C, Lotader AX-8040, Elvax 260, Dupont CXA 136 and 3101 and Lotader HX-8020.

Preferably, the sheet material according to this invention comprises, on the surface of the tie layer, opposite the polymeric carrier, a layer of a polyolefin which is compatible with the support to which the sheet material is to be applied. The polyolefin layer serves to aid in adhering the sheet material to the support and to act as a release layer to prevent sticking when the sheet material is rolled up.

Suitable polyolefins are commercially available, and include such materials as Tenite polypropylene-4240 (melt flow rate of 9.0 g/10 min) and Tenite polyallomer-5L2S (melt flow rate of 6.0 g/10 min), both available from Eastman Chemical Products, Inc. and Shell polypropylene WRS7-327 (melt flow rate of 8 g/10 min). Polyolefins used have a melt flow rate of about 4–20, preferably about 5–12.

The films according to the present invention are preferably formed by cast coextrusion using conventional techniques.

The sheet material of this invention preferably includes a protective and decorative layer such as a paint layer on one surface of the carrier. The paint layer, which may also be referred to herein as a basecoat layer, preferably comprises a colorant incorporated in a film-forming binder. Conventional colorants used in surface coating compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

The heat softening and tensile elongation properties of the paint layer must be compatible with those of the support so as to permit symmetrical elongation. By symmetrical elongation it is meant that the sheet material can undergo substantial elongation by the application of stretching forces without splitting or crazing of the paint layer nor delamination of the paint layer from the support. The sheet material according to this invention provides outstanding symmetrical elongation, which results in part from the thickness and thickness uniformity of the layers.

Preferred paints of those described above have been used on external automobile components of deformable urethanes. Such paints stretch and deform without cracking or delaminating when the urethane is deformed.

A particularly important use for the sheet material relates to its application to exterior automotive panels, whereby the need for spray painting in the manufacture of automobiles can be reduced or eliminated. The sheet material including a substantially clear layer, also referred to herein as a topcoat or clearcoat, adhered to the protective and decorative layer is particularly useful in providing high quality exterior automotive finishes. A topcoat can be incorporated as the outermost layer of the sheet material of this invention. The topcoat and protective and decorative layer can comprise separate strata or a single stratum. The topcoat can provide such desired properties as improved smoothness, high gloss, hardness, durability, resistance to weathering, abrasion resistance, resistance to scratching, chipping and marring, and resistance to spot damage caused by acid rain or pollution.

Topcoat compositions for use with basecoat compositions are well known in the art. They are generally transparent and can comprise crosslinkable polyols such as polyester polyols, polyurethane polyols and acrylic polyols, and polyisocyanate curing agents. In accordance with a preferred embodiment of this invention, the clear layer compositon is applied onto the paint layer of the sheet material. This advantageously results in improved smoothness, excellent gloss and distinctness of image, compared to topcoats applied by conventional spraying techniques. The clear layer is then converted to a dry and tack free state, for example by drying by conventional drying techniques at temperatures of 25°–100° C.

Alternatively, the topcoat and basecoat compositions can be coated as a unitary stratum from one coating composition, or can be coated simultaneously using known techniques, for example, those described in U.S. Pat. Nos. 2,761,791, 2,941,898, 3,206,323, 3,425,857, 3,508,947, 3,645,773 and 4,001,024. Furthermore, it is possible to lay down two or more layers, for example by multiple layer extrusion, of a multi layer sheet material before drying, instead of drying each layer individually before laying down the next layer.

The present invention provides many additional important benefits in the field of automotive finishes. For example, the same sheet material can be used to form decorative and protective coatings on both rigid metal parts and flexible plastic parts of an automobile and accordingly, by use of the identical material for both types of parts, can eliminate problems of color matching. This is much more difficult to do with spray painting, since paints which are suitable for application to rigid metal parts are generally not suitable for application to flexible plastic parts so that two different types of paint have to be used.

Furthermore the present invention is capable of widespread application in many other industrial manufacturing operations—wherever it is desired to provide protective and decorative coatings of very high quality. For example, the sheet material of this invention finds particular utility in products such as office equipment, household appliances, automobile bumpers, auto interior and trim parts, and camera and apparatus housings.

The preferred manner of using the sheet material of this invention comprises the steps of providing a mold in the configuration of the shaped article; positioning within the mold the above described flexible and stretchable sheet material, injecting into the mold a fluid composition which is capable of hardening to both form the desired shaped article and bond to the sheet material (preferably a polyolefin); and removing from the mold a shaped article having a protective and decorative coating formed from the sheet material securely bonded thereto. For example, the sheet material can be integrally bonded to a molded elastomeric article. In this instance, the sheet material is placed in a mold cavity, and a molding material, such as a polyolefin, is injected into the mold cavity under pressure against the sheet material such that the sheet material conforms to the shape of the molded article and bonds to the outer surface of the article. Suitable molds, molding compositions and molding process parameters for this method are well-known and form no part of the present invention. If desired, the sheet material may be preshaped prior to being placed in the mold. Also, conventional thermoforming techniques may be used.

EXAMPLES

The following examples further illustrate the invention.

In the following examples, the polyesterether used has repeat units from trans-1,4-cyclohexanedicarboxylic acid, about 75 mol percent 1,4-cyclohexanedimethanol and about 25 mol percent poly (oxytetramethylene) glycol having a molecular weight of about 800. Copolyester A has repeat units from terephthalic acid, about 30 mol percent ethylene glycol and about 70 mol percent 1,4-cyclohexanedimethanol. Copolyester B has repeat units from terephthalic acid, about 70 mol percent ethylene glycol and about 30 mol percent 1,4-cyclohexanedimethanol.

Also, in the examples, the tie layers are described as follows:

Tie Layer A—A copolymer containing mostly repeat units from ethylene, having a melt flow rate (190° C.) of 1.0 g/10 min, a density of 0.88 g/cm$^3$, a tensile strength at break of 30 kg/cm$^2$, an elongation at break of >500 percent, Izod impact strength of unbreakable, a D-shore hardness of 16, an A-shore hardness of 72, a melting point of 75° C. and excellent clarity. (Admer AT 409C)

Tie Layer B—A copolymer containing mostly repeat units from ethylene, and also repeat units from an acrylic ester and maleic anhydride. Physical properties are as follows: 30% comonomer content, melt flow index of 8 g/10 min, density of 0.93–95 g/cm$^3$.

Tie Layer C—A copolymer containing mostly repeat units from ethylene, but having some repeat units from vinyl acetate (27–29%). Physical properties are 154° C. softening point, melt flow index of 5.3–6.7 g/10 min, density of 0.955 g/cm$^3$, tensile strength of 25 MPa.

Tie Layer D—A copolymer containing mostly repeat units from ethylene but also having repeat units from about 15 mol percent vinyl acetate and about 0.44 percent methylmethacrylate. Physical properties are 87° C. melt point, melt flow index of 2.5 g/10 min, density of 0.931 g/cm$^3$, tensile strength of 14.3 MPa, tensile modulus of 32 MPa.

Tie Layer E—A copolymer containing mostly repeat units from ethylene, but having some from vinyl acetate and maleic anhydride. Physical properties are 87° C. melt point, melt flow index of 3.5 g/10 min, density of 0.937 g/cm$^3$, tensile strength of 13.3 MPa, tensile modulus of 33 MPa.

Tie Layer F—A copolymer containing mostly repeat units from ethylene, but having some from an acrylic ester and maleic anhydride. Physical properties are 23% comonomer content, 80° C. Vicat softening point, melt flow index of 10 g/10 min, density of 0.93–0.95 g/cm$^3$.

Example 1

A three layer film laminate is coextruded from a blend of 85 percent by weight of polyesterether and 15 percent of Copolyester A for the support sheet, Tie Layer A, and Shell polypropylene WRS7-327 for the inside layer. The melt temperatures are 265°, 240°, and 222° C. for support, tie, and inside layers, respectively. Coextrusion block temperature is set at 245° C. Film thicknesses are 5.0, 2.0, and 3.5 mils, respectively. The sheet material is placed against an inside surface of a mold. A substrate thermoplastic polyolefin (Shell Polypropylene WRS7-327) is injection molded onto the film with a melt temperature of 439° F. (226° C.) and mold temperature of 120° F. (49° C.). Average peel strength is measured to be 143 g/mm (8.0 lb./in.).

Example 2

The same sheet components as for Example 1 are used with the same melt temperatures and film thicknesses. Tie Layer B is used. Injection molding conditions are also the same as those used in Example 1. Average peel strength is 66 g/mm (3.7 lb/in.).

Example 3

The same sheet components as for Example 1 are used with the same melt temperatures and film thicknesses. Tie Layer D is used. Injection molding conditions are the same as for Example 1. Average peel strength is 57 g/mm (3.2 lb/in.).

Example 4

A two-layer film of support sheet from Example 1 and a Tie Layer C is coextruded. The melt temperatures are 245° C. and 185° C., respectively. Block temperature is set at 220° C. Film layer thicknesses are 5.5 and 1.0 mils, respectively. Injection molding conditions similar to those of Example 1 are used. Average peel strength is measured to be 84 g/mm (4.7 lb/in.).

Example 5

A three layer film laminate is coextruded from a blend of 75 percent polyesterether and 25 percent Copolyester A (support sheet), Tie Layer A, and Shell polypropylene WRS7-327 for the inside layer. Melt temperatures during coextrusion are 250° C., 224° C., and 195° C., respectively. Coextrusion block temperature is set at 240° C. Film thicknesses are 5.0, 1.0 and 2.0 mils, respectively. The film is placed in the injection molding machine and a thermoplastic polyolefin, Shell WRS7-327 polypropylene, is injected at a melt temperature of (213° C.). Mold temperature is (29° C.). Average peel strength is measured to be 136 g/mm (7.6 lb/in.).

Example 6

For this trial the support sheet is a blend of polyesterether and 40 percent Copolyester A. Tie and inside layers are the same as Example 5. Melt temperatures during coextrusion is 248°, 198°, and 189° C., respectively. Film thicknesses and injection molding conditions are the same as for Example 5. Average peel strength is 148 g/mm (8.3 lb/in.).

Example 7

In this example, the support layer is a blend of 75 percent polyesterether with 25 percent Copolyester B, the tie layer is Tie Layer A, and the inside layer is high-density polyethylene. Melt temperatures of the layers during coextrusion are 249°, 224° and 190° C. Film thicknesses and injection molding conditions are the same as for Example 5. Average peel strength is 213 g/mm (11.9 lb/in.).

Example 8

In this example, the support sheet and tie layer are the same as for Example 7. The inside layer is polypropylene. Melt temperatures during coextrusion, film thicknesses, and molding conditions are the same as for Example 7. Average peel strength is 191 g/mm (10.7 lb/in.).

Example 9

A three layer film laminate is coextruded from a blend of 60 percent polyesterether and 40 percent Copolyester A, tie layer is Tie Layer A, and the inside layer is WRS7-327 polypropylene. The film laminate is then coated with a pigmented base coat and top coat. Melt temperatures during coextrusion are 273°, 271° and 260° C. for the three layers, respectively. Film thicknesses are 5.0, 1.0 and 3.0 mils, respectively. Molding process melt temperature is 234° C. and mold temperature is 29° C. Average peel strength is measured to be 227 g/mm (12.7 lb/in.).

In the above examples, from the peel strengths it can readily be seen that there is excellent adhesion between this sheet and the substrate. Also, all the examples illustrate that using the protective and decorative sheet according to this invention, provides a high quality coating of attractive appearance. There appear to be no detrimental effects on the finish resulting from the molding procedure.

Whenever the term "inherent viscosity" (I.V.) is used in this application, it will be understood to refer to viscosity determinations made at 25° C. using 0.50 gram of polymer per 100 mL of a solvent composed of 60 wt. % phenol and 40 wt. % tetrachloroethane.

The "melting point" ($T_m$) of the polymers described in this application are readily obtained with a Differental Scanning Calorimeter.

The strength of the bonds is determined by the so called "Peel Test" based on a modification (i.e., three test specimens) of the ASTM "T-Peel Test" set forth on pages 63 and 64 of the 1964 edition of the BOOK OF ASTM STANDARDS, published by the American Society of Testing Materials, and more specifically identified as Test Number D-1876-61-T.

| | |
|---|---|
| Melt Flow Rate | ASTM D1238 |
| Density | ASTM D1505 |
| Tensile Strength | ASTM D638 |
| Elongation | ASTM D638 |
| Izod Impact Strength | ASTM D256 |
| D and A Shore Hardness | ASTM D256 |
| Melting Point | DSC (differential scanning colorimetry) |

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A protective and/or decorative sheet material for covering substrates comprising
   (a) a carrier layer comprising a polymer selected from polyesterethers, copolyesters and blends thereof,
   (b) a tie layer bonded thereto, said tie layer being a low molecular weight polymer containing ethylene repeat units modified with about 0.1 to about 30 wt. percent of at least one unsaturated monomer which can be copolymerized with ethylene, said tie layer having a melt flow rate of about 0.25 to about 40 g/10 min, a tensile strength at break of at least 25 kg/cm$^2$, an elongation at break of greater than 100% and a melting point of at least 65° C.,
   (c) a layer of polyolefin bonded to the surface of said tie layer opposite said polymeric support, and
   (d) a decorative and/or protective coating bonded to the surface said polymeric support opposite said tie layer.

2. Sheet material according to claim 7 wherein said decorative and/or protective coating is paint.

3. Sheet material according to claim 7 wherein a top or clearcoat is applied to said decorative and/or protective coating.

4. A structural element comprising a substrate having securely bonded to at least one surface thereof in a smooth and wrinkle-free state a sheet material according to claim 7.

5. A sheet material especially adapted for bonding to and covering polyolefin substrates comprising (a) a carrier layer comprising a polymer selected from polyesterethers, copolyesters and blends thereof, and (b) a tie layer bonded thereto, said tie layer being a low molecular weight polymer of ethylene repeat units modified with about 0.1 to about 30 wt. percent of at least one unsaturated monomer which can be copolymerized with ethylene, said tie layer having a melt flow rate of about 0.25 to about 40 g/10 min, a tensile strength at break of at least 25 kg/cm$^2$, an elongation at break of greater than 100% and a melting point of at least 65° C.

6. Sheet material according to claim 1 wherein said tie layer has a melt flow rate at 190° C. of about 0.8–1.2 g/10 min, a density of about 0.86–0.90, a tensile strength at break of about 25–35 kg/cm$^2$, an elongation at break of <450%, an Izod impact strength of unbreakable, a D-shore hardness of about 14–18, an A-shore hardness of about 70–74 and a melting point of at least 70° C.

7. A sheet material according to claim 1 which further comprises a coating bonded to the side of said carrier layer opposite said tie layer.

8. A sheet material according to claim 1 wherein said carrier layer consists essentially of said polyesterether.

9. A structural element comprising polyolefin a substrate having securely bonded to at least one surface thereof in a smooth and wrinkle-free state a sheet material as described in claim 1.

10. A sheet material according to claim 1 wherein said carrier layer comprises a blend of a polyesterether and a copolyester having repeat units from terephthalic acid and at least two glycols having from 2 to 10 carbon atoms.

11. Sheet material according to claim 10 wherein said glycols are ethylene glycol and 1,4-cyclohexanedimethanol.

* * * * *